United States Patent [19]

Hetherington et al.

[11] 4,350,266

[45] Sep. 21, 1982

[54] PUMPING SYSTEM FOR UNSTABLE FLUIDS

[75] Inventors: Robert D. Hetherington, Sunland; David W. Goelz, Burbank, both of Calif.

[73] Assignee: Binks Manufacturing Company, Franklin Park, Ill.

[21] Appl. No.: 46,969

[22] Filed: Jun. 8, 1979

[51] Int. Cl.³ .......................... B67D 5/38; G01F 11/02

[52] U.S. Cl. ....................................... 222/40; 222/276; 222/334; 417/397

[58] Field of Search ................. 222/334, 275, 276, 61, 222/63, 137, 249, 250, 40; 417/397; 251/121, 205

[56] References Cited

U.S. PATENT DOCUMENTS

| | | | |
|---|---|---|---|
| 3,249,053 | 5/1966 | Govan | 417/397 X |
| 3,259,054 | 7/1966 | Vanzo et al. | 222/63 X |
| 4,116,364 | 9/1978 | Culbertson et al. | 222/334 X |

FOREIGN PATENT DOCUMENTS

| | | | |
|---|---|---|---|
| 218823 | 11/1958 | Australia | 251/121 |
| 300334 | 11/1928 | United Kingdom . | |
| 300191 | 9/1929 | United Kingdom . | |
| 1320432 | 6/1973 | United Kingdom . | |
| 1521878 | 8/1978 | United Kingdom . | |

*Primary Examiner*—F. J. Bartuska
*Attorney, Agent, or Firm*—David O'Reilly

[57] ABSTRACT

A pumping system for delivering unstable fluids under pressure, comprising a pair of alternately operated single-acting pumps operated by a double-acting air motor. The air motor is controlled by a reversible spool valve and mechanically operated air pilot valves. The single-acting pumps deliver and contain relatively small quantities of the unstable fluid to a positive flow metering system for connection to an outlet to spray guns or other equipment using the fluid. The metering system includes a metering valve, a flow meter and a bypass valve for removing trapped air and presetting flow.

11 Claims, 8 Drawing Figures

PUMPING SYSTEM FOR UNSTABLE FLUIDS

BACKGROUND OF THE INVENTION

This invention relates to a pumping system for unstable fluids.

In the fiberglas reinforced products (FRP) and plastic industries, unstable fluids, which are highly volatile, are used with resins in manufacture of a variety of products. Typically the volatile fluid is a catalyst, such as MEKP (methyethyl ketone proxide) which is delivered from a spray gun with a resin for coating and manufacturing of fiberglas products. The use of spray guns and other such pouring or spraying equipment is for high-volume production techniques requiring a constant supply of large quantities of catalyst. Typically the catalyst is delivered under pressure from containers having quantities as large as five gallons. Because of the instability of catalysts, such large quantities under pressure can be extremely dangerous. Explosions and fires can result with such unstable fluids from shock, heat or friction.

An added danger is introduced by the necessity of transferring the volatile unstable catalyst from shipping containers to the pressure containers for delivery to the production systems. This can result in contamination as well as increase the danger of fire or explosion.

These problems can occur because of the necessity of carefully controlling the flow rate of the catalyst to the delivery or spray system. The catalyst must be delivered in carefully controlled amounts for correct mixture with other components, such as resin; thus large quantities of catalyst contained in a pressure vessel, providing a continuous metered flow, are necessary.

SUMMARY OF THE INVENTION

The purpose of the present invention is to provide a delivery system in which unstable fluids are delivered at a constant rate with only a small amount of liquid being under pressure at any particular time.

The purposes described above are accomplished by a catalyst pumping system employing single-acting pumps operating alternately by means of an air motor. The air motor is a dual-acting air motor which alternately operates a pair of pumps to pump fluid from one pump while the other pump is taking fluid in. At the end of a stroke the air motor is reversed to reverse the cycle to pump from the second pump while the first pump is taking fluid in. A pneumatic control system is employed which automatically, through means of a control valve and pilot valves, reverses the air on the air motor, reversing the operation of the pumps. Catalyst from a shipping container is commonly connected by means of a tube through a tee to an inlet of the respective pumps. Outlets of the respective pumps deliver a constant flow of catalyst at a constant pressure to a metering system for delivery to spray guns and the like. The metering system includes a unique flow regulating valve designed for use with fluids which tend to clog the usual needle valves. When the operation of the pumps is reversed, there is no fluctuation in flow because of the fast shifting of the pneumatic control valve and the damping of the metering valve.

The flow metering system includes a flow gauge showing the rate of flow and a bypass valve at the outlet of the flow gauge for relieving build-up of trapped air bubbles in the system after a long period of disuse.

Catalyst is delivered from a shipping container to the pumps which respectively pump less than one ounce each, which means there is less than an ounce of catalyst in the pump at any given time. Thus, any reaction or explosion will be relatively small reducing considerably the possibility of severe damage.

It is one object of the present invention to provide a pumping system for unstable fluids which contains only a small volume of the fluid under pressure.

Still another object of the present invention is to provide a pumping system for unstable fluids which utilizes low-volume pumps.

Yet another object of the present invention is to provide a pumping system for unstable fluids which provides a positive metering system.

Still another object of the present invention is to provide a pumping system for unstable fluids which permits pumping of the fluid directly from the shipping containers.

These and other objects and advantages of the features of the invention will become apparent from the following detailed description in conjunction with the drawings, wherein like reference numbers identify like parts throughout.

DETAILED DESCRIPTION OF THE PREFERRED EMBODIMENT

Figure 1:
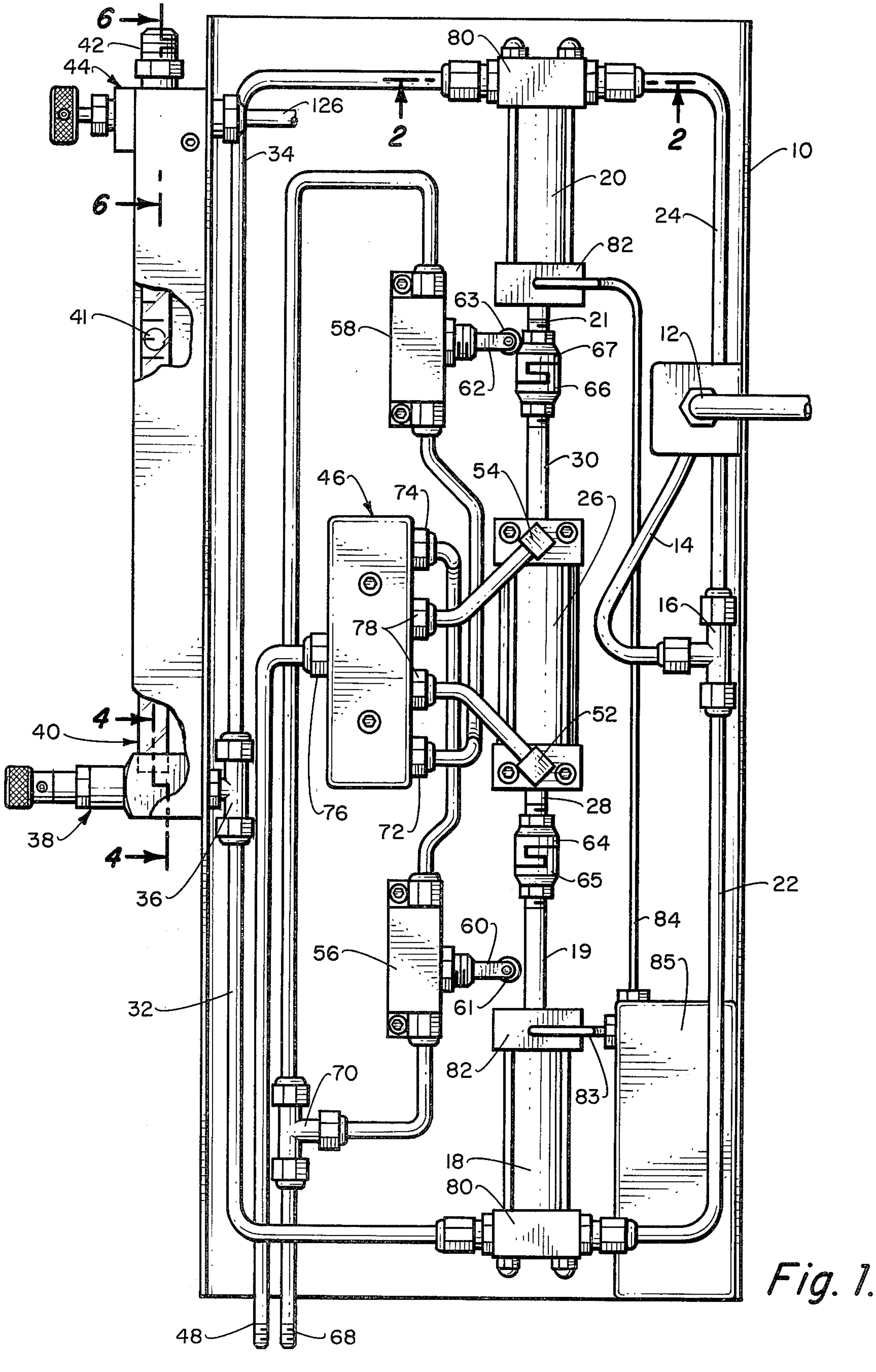
FIG. 1 is a plan view of the pumping system according to the invention.

In FIG. 1 a pumping system is shown mounted on a sheet metal base plate 10 for installation in a cabinet (not shown). The pumping system includes a fitting 12 for connecting a catalystsupply (not shown) by means of a tube connected to the shipping container. These are usually one or two-gallon plastic bottles. Catalyst is thus delivered through connector 12 and tubing 14 to a tee 16 for connecting to single-acting pumps 18 and 20 by means of tubing 22 and 24.

The single-acting pumps 18 and 20 are operated by means of a double-acting, double-ended air motor 26 driving piston rods 28 and 30 to alternately operate the pumps 18 and 20.

The output of the pumps is commonly connected by tubes 32 and 34 to a second tee 36 which delivers the catalyst under pressure to a metering valve 38, which controls the flow of the catalyst to a flow gauge 40. The catalyst is then delivered to the spray gun through outlet 42.

The air motor 26 is a double-acting motor whose operation is controlled by a pneumatic control valve 46 which is a reversible air-operated air return spool valve which reverses the flow of regulated air supplied through tube 48 to fittings 52 and 54 respectively at opposite ends of air motor 26.

Air pilot valves 56 and 58 are operated mechanically by means of rollers 61 and 63 on plungers 60 and 62, which engage cam surfaces 65, 67 on couplings 64, 66.

When activated they deliver unregulated air from a source (not shown) connected through fitting 68 to operate the spool of pneumatic control valve 46. The unregulated air is simultaneously delivered through tee 70 to the air pilot valves 56 and 58.

The air motor 26 has its piston rods 28 and 30 connected by means of self-aligning couplings 64 and 66 to pump piston rods 19 and 21. The U-shape interlocking fittings of the couplings 64 and 66 automatically compensate for any slight misalignment which might occur from the respective piston rods. Self-alignment of the pumps is also assisted by securing the pumps with floating mounts. That is, the pumps are not bolted tightly to base plate 10 but are loosely secured to allow them to "float" to compensate for any misalignment of the air motor and pump piston rods.

Each coupling has a cam surface 65 and 67 respectively which engages a roller 61 and 63 respectively on the air pilot valve plungers 60 and 62 for reversing the spool in pneumatic control valve 46 to reverse the operation of the air motor 26. Thus, when the air motor 26 reaches the end of its stroke, the respective cam surface engages the pilot valve roller 63, opening the pilot valve and shifting the spool valve 46 to reverse the flow of regulated air to the air motor and thus reversing its operation. As shown in FIG. 1, the system is about to reverse to start pumping from pump 18, while fluid is being taken into pump 20. Thus, the pumps 18 and 20 are alternately operating in a discharge/intake sequence. While pump 18 is discharging (i.e. pumping), pump 20 is intaking (i.e. filling). When air motor 26 reverses its operation, pump 20 will then be pumping while pump 18 is filling.

The air pilot valves 56 and 58 are extremely fast-acting roller plunger pilot valves which operate pneumatic spool valve 46 on movement of the plunger a small amount, and are readily available in the art. The pneumatic control valve 46 is an air-operated, air-return, two-position, three-port valve. Operator ports 72 and 74 receive unregulated air from pilot valves 56, 58 to shift the spool for changing regulated air from inlet port 76 to one or the other of outlet ports 78. Thus, when cam 67 engages plunger roller 63 of plunger 62, air pilot valve 58 opens, shifting the spool of pneumatic control valve 46, reversing the regulated air from connector 48 to air motor 26, thus reversing the action of the pumps 18 and 20.

Each of the pumps 18 and 20 is provided with a head 80 controlling the flow into and out of the pump and a base 82. Each base 82 includes drainpipes 83 and 84 connected to a sump 85 for draining any catalyst which collects behind the pistons of the pumps.

Figure 2:
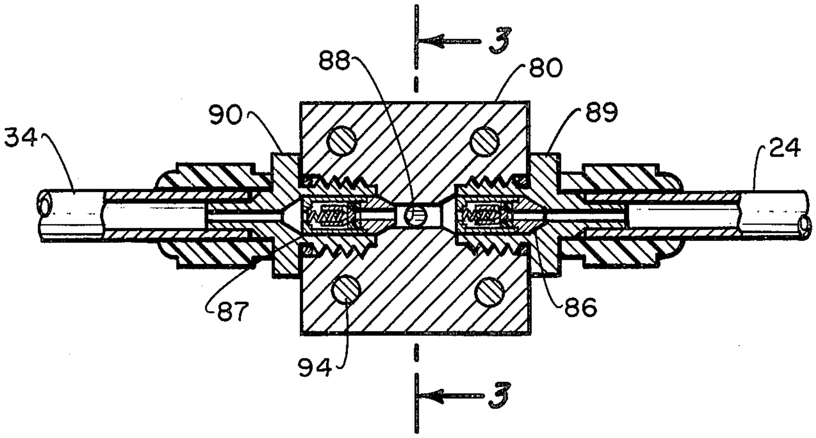
FIG. 2 is a sectional view taken at 2—2 of FIG. 1.
Figure 3:
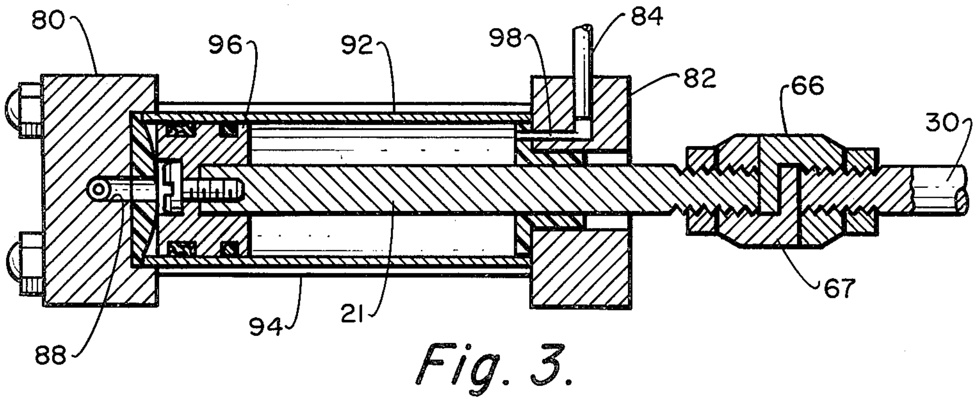
FIG. 3 is a sectional view of the pump used in the pumping system taken at 3—3 of FIG. 2.

The pump details are shown more clearly in the sectional views of FIGS. 2 and 3. In FIG. 2 each pump head 80 has two check valves 86 and 87 for controlling the direction of flow of catalyst to and from the pumps. Catalyst flows into the pump through port 88 from tube 24 connected to check valve retainer 89. Catalyst flows out of the pump through tube 34 through check valve retainer 90. Thus, when pump 20 is taking in fluid, fluid flows through tube 24, check valve 86, through port 88 into the pump cylinder while check valve 87 is closed. When pump 20 is pumping fluid, the fluid flows out of port 88 and is blocked by check valve 86, causing the catalyst to flow through check valve 87 to tube 34.

The pump construction is shown in greater detail in FIG. 3. Each pump is identical and is comprised of a cylinder 92 mounted between head 80 and base 82, being secured by four retaining rods 94. Pump cylinders 92 typically have a maximum capacity of less than one ounce to maintain the volume of catalyst under pressure at any time at a very low level. Inside the cylinder 92 is a piston 96 operated by a piston rod 21 connected to the air motor by means of coupling 66 joined to air motor rod 30. Drain 84 connected to drain port 98 provides a bleed system for any catalyst collecting behind the piston.

Figure 4:
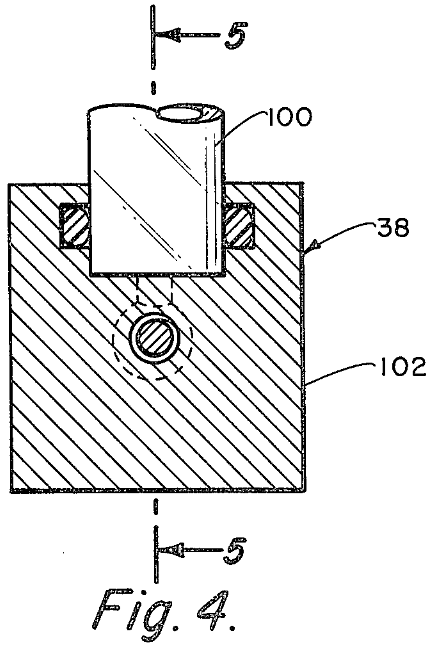
FIG. 4 is a sectional view of the flow metering valve taken at 4—4 of FIG. 1.
Figure 5:
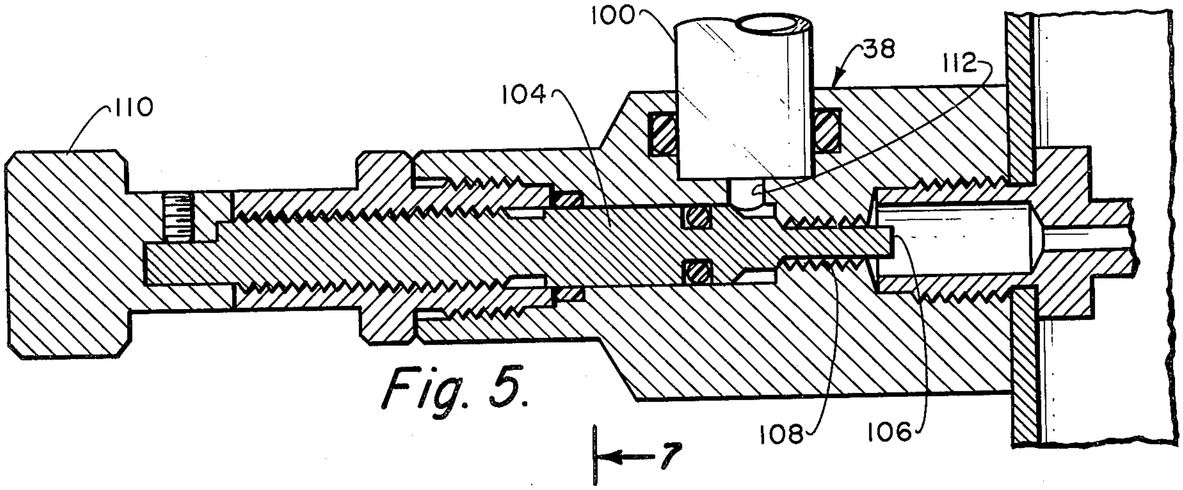
FIG. 5 is a sectional view taken at 5—5 of FIG. 4.

Catalyst delivered by the alternately single-acting pumps 18 and 20 is delivered to a flow metering system comprised of metering valve 38, which is shown in greater detail in FIGS. 4 and 5. A tube 100 of flow gauge 40 seats a socket in metering valve block 102. Because of the unique properties of catalyst, flow metering valve 38 was specially designed to assure constant flow during operation and is illustrated in detail in FIG. 5. The valve 38 is provided with a threaded adjustable core 104 having a straight stem 106 engaging a helical channel 108. The channel 108 is a bore having helical grooves. In its present position, the regulator or metering valve 38 is shown closed. To increase flow, the knob 110 is rotated counterclockwise, withdrawing straight stem 106 from helical channel 108. The further needle stem 106 is withdrawn from the helical channel 108, the greater the flow of catalyst to the flow metering gauge 40. The maximum outer diameter of the straight stem 106 is a close fit to the maximum inner diameter of the helical channel 108, thus forcing the flow through the helical channel 108 only to the outer port 112 for delivery to flow gauge 40. Maximum flow would occur when stem 106 is completely withdrawn from the helical channel 108. The flow metering valve 38 is adjusted to the predetermined flow desired as indicated by the level of the flow indicator ball 41 in the flow gauge 40.

Figure 6:
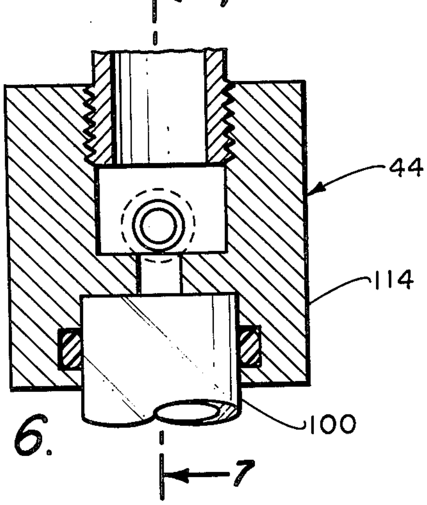
FIG. 6 is a sectional view taken at 6—6 of FIG. 1.
Figure 7:
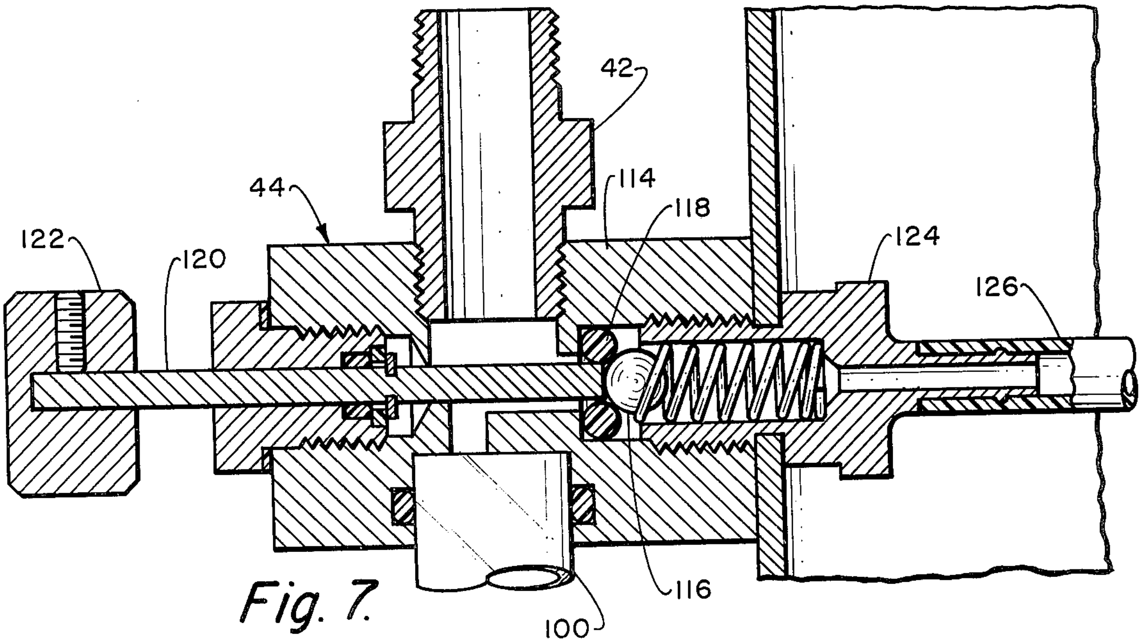
FIG. 7 is a sectional view taken at 7—7 of FIG. 6.

When the catalyst pumping system is shut down for a period of time, such as overnight, air pressure in the form of trapped air bubbles may build up in the pumps or lines which deliver the catalyst to a check valve in the outlet 42. For this reason the outlet of the flow gauge 40 is connected to a bypass valve 44, shown in greater detail in FIGS. 6 and 7. Flow gauge tube 100 seats in block 114 of the bypass valve and flow simulator 44. Bypass valve 44 is normally closed with ball 116 seated against a seal 118. Ball 116 may be momentarily displaced from the seal 118 by operation of plunger 120 to release trapped air bubbles or act as a flow simulator. This is accomplished by pushing on knob 122, bypassing air or pressure in the system to fitting 124, connected by means of tube 126 back to the catalyst supply. Thus, the bypass valve 44 primes the system by removing any air bubbles collected or excess pressure readying the system for an instantaneous supply of catalyst to the hose connector or outlet 42. Thus, the bypass valve also acts as a flow simulator to preset the metered flow.

Figure 8:
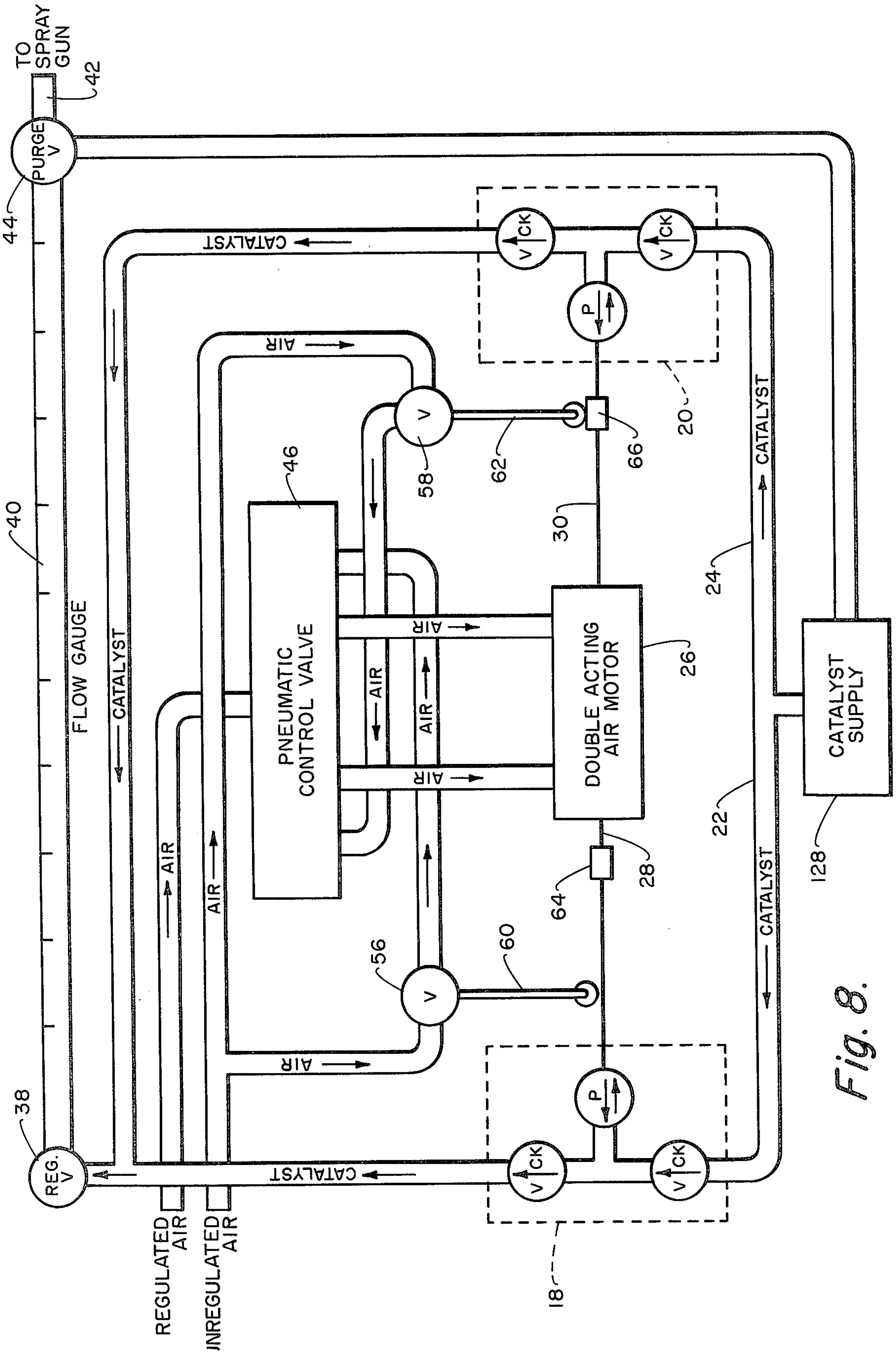
FIG. 8 is a semi-schematic diagram illustrating the operation of the invention.

The operation of the system is illustrated in the schematic diagram of FIG. 8. The catalyst supply 128 is connected to pumps 18 and 20 by means of delivery tubes 22 and 24. Once connected, air is supplied to air pilot valves 56 and 58 and pneumatic control valve 46. The schematic shows air pilot valve 58 being operated by means of coupling 66 engaging plunger 62. At this point, valve 58 will open, supplying air to shift pneumatic control valve 46. The flow of air to air motor 26 will be reversed, causing the double-acting motor to start pump 18 into its discharge or pumping mode, while pump 20 will begin its intake mode. At this time fluid is being pumped from pump 18 to metering valve 38.

Simultaneously, catalyst from catalyst supply 128 is flowing through tube 24 to fill the cylinder of pump 20. At the end of the air motor stroke, the cam 65 on coupling 64 will engage the roller 61 on plunger 60 of pilot valve 56, which shifts the pneumatic control valve 46, thus reversing the supply of regulated air to double-acting motor 26. Pump 20 will now begin its discharge or pumping mode while pump 18 will begin its intake mode. Catalyst will now be pumped from pump 20 to metering valve 38, while catalyst from catalyst supply 128 will flow through tube 22 to the cylinder of pump 18. The rate of flow to outlet check valve in outlet 42 will be controlled by adjustment of metering valve 38 as indicated by the flow ball 41 of flow gauge 40. As can be seen by the schematic diagram bypass valve 44 permits purging of air bubbles or pressure in the system by bypassing catalyst back to the catalyst supply 128.

The rapid operation of the pneumatic control system comprised of the control valve 46 and pilot valves 56 and 58 along with the damping provided by metering valve 38, eliminates any surges and assures constant flow. Reversal of operation of the air motor 26 is accomplished quickly and smoothly without hesitation. The smooth operation is enhanced by the use of self-aligning couplings 64 and 66 in conjunction with the floating mounts for the pumps 18 and 20.

The pumping system operates on a demand basis. That is, when outlet check valve in outlet 42 is connected to a spray gun or other device, it is turned on and catalyst flows through the flow gauge, allowing the double-acting air motor which is under constant pressure from the regulated air, to begin operating whichever pump is in the pumping mode, causing catalyst to flow instantaneously to the spray gun. When the trigger of the spray gun is released, a static pressure head is created against the piston in either of the pumps, causing the pumps to stop. Operation of the trigger of the spray gun releases the static pressure head, allowing the constant regulated air pressure on the double-acting air motor to begin the alternating pumping cycle again. As was stated previously, less than one ounce of unstable catalyst is being delivered by the pumps at any one time, thus considerably reducing the danger of any major or serious fire or explosions.

Thus, there has been described a novel pumping and delivery system for unstable fluids in which constant pressure, constant volume supply of catalyst may be provided with minimum danger of accidents, contamination or fire. The catalyst is supplied at a predetermined metered flow rate necessary for correct mixture with other components with a mimimum volume under pressure at any time to minimize the danger of explosion or fire.

Obviously, many modifications and variations of the present invention are possible in light of the above teachings. It is therefore to be understood that the full scope of the invention is not limited to the above description but may be practiced other than in the mode contemplated above.

What is claimed is:

1. A system for pumping unstable fluids comprising:
   a pair of single-acting pumps having a predetermined low-volume capacity;
   a double-acting air motor for simultaneous operation of said pumps;
   pneumatic control means for reversing the operation of said double-acting motor to reverse the operation of said pumps from pumping to filling and vice versa;
   said pneumatic control means comprising:
      a pair of air pilot valves, each of said air pilot valves including an actuating arm having a roller at the end,
      a pneumatic control valve means connected to said air pilot valves for reversing the flow of air to said motor,
      said pair of air pilot valves, directly connecting said pneumatic control valve means to a supply of air,
   mechanical means coupling said air motor to said pumps and adapted to operate said air pilot valves;
   said mechanical coupling means comprising:
      a pump piston rod,
      an air motor piston rod,
      coupling means coupling said pump piston rod to said air motor piston rod,
      said coupling means having a cam surface for engaging the roller on said actuating arm to operate one or the other of said air pilot valves proximate the end of a stroke,
   fluid supply means commonly connected to inputs of said pumps;
   flow control means commonly connected to outlets of said pumps;
   whereby when said motor operates one pump is discharging fluid while the other is taking fluid in and when said motor is reversed, the other of said pumps is discharging fluid while said one pump is taking fluid in so that fluid is pumped at a constant flow rate to said flow control means.

2. The pumping system according to claim 1 wherein the volumetric capacity of each of said pumps is less than about one fluid ounce.

3. The pumping system according to claim 1 wherein said metering means comprises:
   a metering valve connected to the outlets of said pumps;
   a flow gauge connected to the outlet of said metering valve; and
   bypass means connected to the outlet of said flow gauge.

4. The pumping system according to claim 3 wherein said metering valve comprises a helical channel; and
   means for varying the length of said helical channel through which said fluid travels.

5. The pumping system according to claim 4 wherein said means for varying the length of said helical channel comprises a stem adjustably engaging said helical part.

6. The pumping system according to claim 5 wherein the outside diameter of said adjustable stem is a close fit to the minimum internal diameter of said helical channel.

7. The pumping system according to claim 3 wherein said bypass means comprises:
   a normally closed valve; and
   connecting means connecting said bypass valve to said fluid supply means whereby pressure and trapped air bubbles may be purged from the pump system for stabilizing the pressure and presetting the flow after a period of nonuse.

8. The pumping system according to claim 1 wherein said pneumatic control valve means comprises:
   an air-operated air return spool valve having one inlet and a pair of outlets; and said inlet being connected to a source of regulated air and said outlets being connected to opposite ends of said air motor respectively.

9. The pumping system according to claim 8 wherein said coupling means comprises a self-aligning coupling.

10. The pumping system according to claim 9 wherein said pumps are supported on floating mounts.

11. The pumping system according to claim 1 wherein said coupling means comprises a self-aligning coupling.

* * * * *